United States Patent
Cho et al.

(10) Patent No.: US 10,697,589 B2
(45) Date of Patent: Jun. 30, 2020

(54) HIGH-PRESSURE GAS SUPPLYING APPARATUS

(71) Applicant: KOREA AEROSPACE RESEARCH INSTITUTE, Daejeon (KR)

(72) Inventors: Nam Kyung Cho, Daejeon (KR); Chae Hyung Kim, Sejong-si (KR); Jun Su Jeon, Asan-si (KR); Young Min Han, Daejeon (KR)

(73) Assignee: Korea Aerospace Research Institute, Daejeon (KR)

(*) Notice: Subject to any disclaimer, the term of this patent is extended or adjusted under 35 U.S.C. 154(b) by 72 days.

(21) Appl. No.: 16/130,571

(22) Filed: Sep. 13, 2018

(65) Prior Publication Data

US 2019/0154202 A1 May 23, 2019

(30) Foreign Application Priority Data

Nov. 17, 2017 (KR) .................. 10-2017-0153655

(51) Int. Cl.
F17C 13/04 (2006.01)
F16L 55/07 (2006.01)
(Continued)

(52) U.S. Cl.
CPC .............. *F17C 13/04* (2013.01); *F16K 1/303* (2013.01); *F16K 1/44* (2013.01); *F16K 24/04* (2013.01); *F16K 25/005* (2013.01); *F17C 5/06* (2013.01); *F17C 13/00* (2013.01); *G01F 15/002* (2013.01); *G05D 16/00* (2013.01); *F16L 55/07* (2013.01); *F17C 2203/0673* (2013.01); *F17C 2221/012* (2013.01); *F17C 2225/0123* (2013.01); *F17C 2225/035* (2013.01); *F17C 2225/036* (2013.01); *F17C 2227/0325* (2013.01); *F17C 2227/04* (2013.01); *F17C 2227/044* (2013.01); *F17C 2250/043* (2013.01); *F17C 2250/0443* (2013.01); *F17C 2260/026* (2013.01);
(Continued)

(58) Field of Classification Search
CPC .......... F17C 13/04; F16L 55/07; F16K 24/04; F16K 1/44; Y10T 137/5762; Y10T 137/5907
USPC ....................................................... 137/312
See application file for complete search history.

(56) References Cited

U.S. PATENT DOCUMENTS 7,604,017 B2 * 10/2009 O'Hara .................... F17D 5/02
137/1
7,934,516 B1 * 5/2011 Jaynes .................... E03B 11/16
137/312
(Continued)

FOREIGN PATENT DOCUMENTS

KR 10-2011-0032942 A 3/2011
KR 10-2011-0033476 A 3/2011
(Continued)

*Primary Examiner* — Kevin L Lee
(74) *Attorney, Agent, or Firm* — Rabin & Berdo, P.C.

(57) ABSTRACT

Provided is a high-pressure gas supplying apparatus that may minimize impact to be exerted on a valve seat in a regulator and may reuse condensate water or gas produced from leaking gas that is gradually discharged to the outside. That is, it is possible to collect and reuse moisture (condensate water) or gas produced by the Joule-Thomson effect from leaking gas that is gradually discharged to the outside by the leaking gas discharge unit.

5 Claims, 6 Drawing Sheets

(51) Int. Cl.
*F16K 1/30* (2006.01)
*F16K 25/00* (2006.01)
*F16K 24/04* (2006.01)
*F16K 1/44* (2006.01)
*G01F 15/00* (2006.01)
*G05D 16/00* (2006.01)
*F17C 5/06* (2006.01)
*F17C 13/00* (2006.01)

(52) U.S. Cl.
CPC ............... *F17C 2265/065* (2013.01); *F17C 2270/0168* (2013.01); *G01F 15/003* (2013.01); *Y10T 137/5907* (2015.04)

(56) References Cited

U.S. PATENT DOCUMENTS 8,448,658 B2 * 5/2013 Jin et al. ............... B65D 90/24
137/15.11
2012/0204975 A1 8/2012 Chen

FOREIGN PATENT DOCUMENTS

| KR | 10-2011-0068080 A | 6/2011 |
| KR | 10-2013-0025104 A | 3/2013 |

* cited by examiner

HIGH-PRESSURE GAS SUPPLYING APPARATUS

CROSS-REFERENCE TO RELATED APPLICATIONS

This application claims the priority of Korean Patent Application No. 10-2017-0153655 filed on Nov. 17, 2017, in the Korean Intellectual Property Office, the disclosure of which is incorporated herein by reference.

BACKGROUND

Field

The present disclosure relates to a high-pressure gas supplying apparatus.

Description of the Related Art

In general, a high-pressure gas supplying apparatus is an apparatus for delivering high-pressure gas to a consumer. As illustrated in FIG. 1, a high-pressure gas supplying apparatus in the related art includes a flow path 11 which connects a gas supply source 1 and a consumer (user) 2, a regulator 12 which is provided in the flow path and adjusts pressure of gas from the gas supply source 1 to pressure required by the consumer 2, an inlet valve 13 which is provided in the flow path between the gas supply source 1 and the regulator 12, and an outlet valve 14 which is provided in the flow path between the regulator 12 and the consumer 2. Therefore, when gas from the gas supply source 1 is applied to the regulator 12 via the inlet valve 13, the regulator 12 may adjust pressure of the applied gas to pressure required by the consumer 2 and may send the gas to the consumer 2 via the outlet valve 14.

Further, as illustrated in FIG. 1, the high-pressure gas supplying apparatus in the related art further includes a safety valve 15 which is provided in the flow path between the regulator 12 and the outlet valve 14 and rapidly discharges gas to the outside when the regulator 12 leaks in a state in which the outlet valve 14 is closed. Specifically, the safety valve 15 sets setting pressure to 1.15 to 1.2 times service pressure. When pressure of gas reaches the setting pressure, the safety valve 15 operates to rapidly discharge the gas to the outside.

However, the high-pressure gas supplying apparatus in the related art has a problem in that when gas is applied to the regulator 12 at a high flow rate, impact is exerted on a valve seat of the regulator 12, and thus the valve seat is damaged, such that a leak in the regulator 12 is increased.

In addition, there is a problem in that gas cannot be serviced when the safety valve 15 operates. In particular, there is a problem in that the entire gas supplying apparatus needs to be repaired if the operated safety valve 15 cannot be reset.

In addition, there is a problem in that in a case in which the valve seat of the regulator 12 is intended to be replaced to solve the fundamental problem, the gas service needs to be ceased, and the gas supplying apparatus needs to be repaired.

SUMMARY

A technical object of the present disclosure is to provide a high-pressure gas supplying apparatus capable of minimizing impact to be exerted on a valve seat of a regulator or the like.

Another technical object of the present disclosure is to provide a high-pressure gas supplying apparatus capable of gradually and continuously discharging leaking gas from a regulator to the outside.

Still another technical object of the present disclosure is to provide a high-pressure gas supplying apparatus capable of reusing condensate water or gas produced from leaking gas that is gradually discharged to the outside.

To achieve the aforementioned objects, a high-pressure gas supplying apparatus according to an exemplary embodiment of the present disclosure is a high-pressure gas supplying apparatus for delivering gas from a gas supply source to a consumer, and includes: a main flow path which connects the gas supply source and the consumer; a regulator which is provided in the main flow path and adjusts pressure of the gas from the gas supply source to pressure required by the consumer; a first inlet valve which is provided in the main flow path between the gas supply source and the regulator; a bypass flow path which is provided in the main flow path between the gas supply source and the regulator and bypasses the first inlet valve; and a second inlet valve which is provided in the bypass flow path and disposed in parallel with the first inlet valve.

The present disclosure provides the high-pressure gas supplying apparatus capable of minimizing impact to be exerted on the valve seat of the regulator or the like and has an effect in that it is possible to reuse condensate water or gas produced from leaking gas that is gradually discharged to the outside.

In addition, the present disclosure has a collector, thereby collecting and reusing moisture (condensate water) or gas produced by the Joule-Thomson effect from leaking gas that is gradually discharged to the outside by the leaking gas discharge unit.

BRIEF DESCRIPTION OF THE DRAWINGS

The above and other aspects, features and other advantages of the present disclosure will be more clearly understood from the following detailed description taken in conjunction with the accompanying drawings, in which.

DETAILED DESCRIPTION OF THE PREFERRED EMBODIMENT

Hereinafter, exemplary embodiments of the present disclosure will be described in detail with reference to the accompanying drawings so that those skilled in the technical field to which the present disclosure pertains may easily carry out the exemplary embodiment. However, the present disclosure may be implemented in various different ways, and is not limited to exemplary embodiments described herein.

Figure 1:
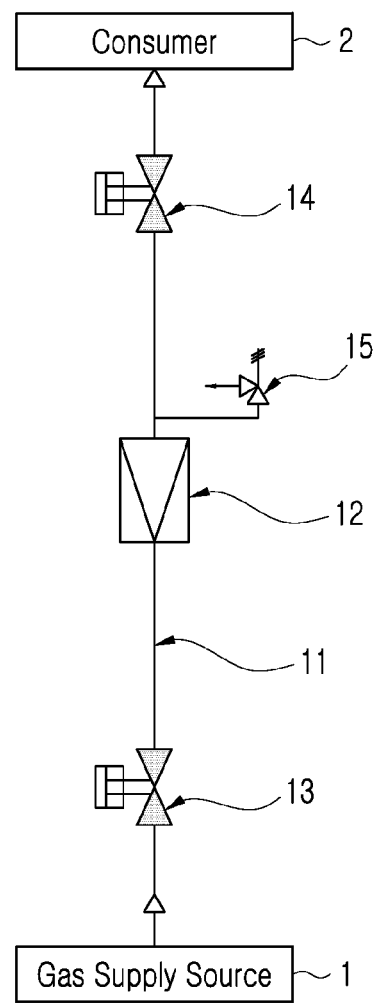
FIG. 1 is a view schematically illustrating a high-pressure gas supplying apparatus in the related art.
Figure 2:
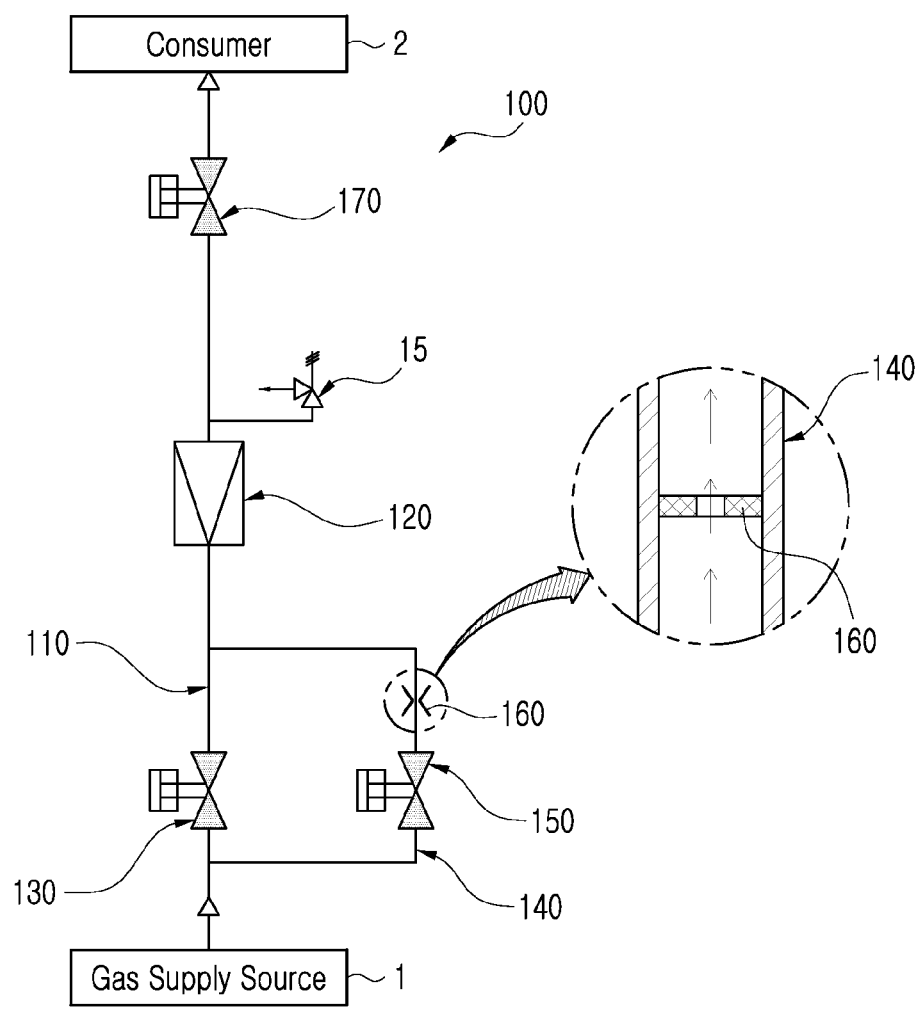
FIG. 2 is a view schematically illustrating a high-pressure gas supplying apparatus according to an exemplary embodiment of the present disclosure.
Figure 3:
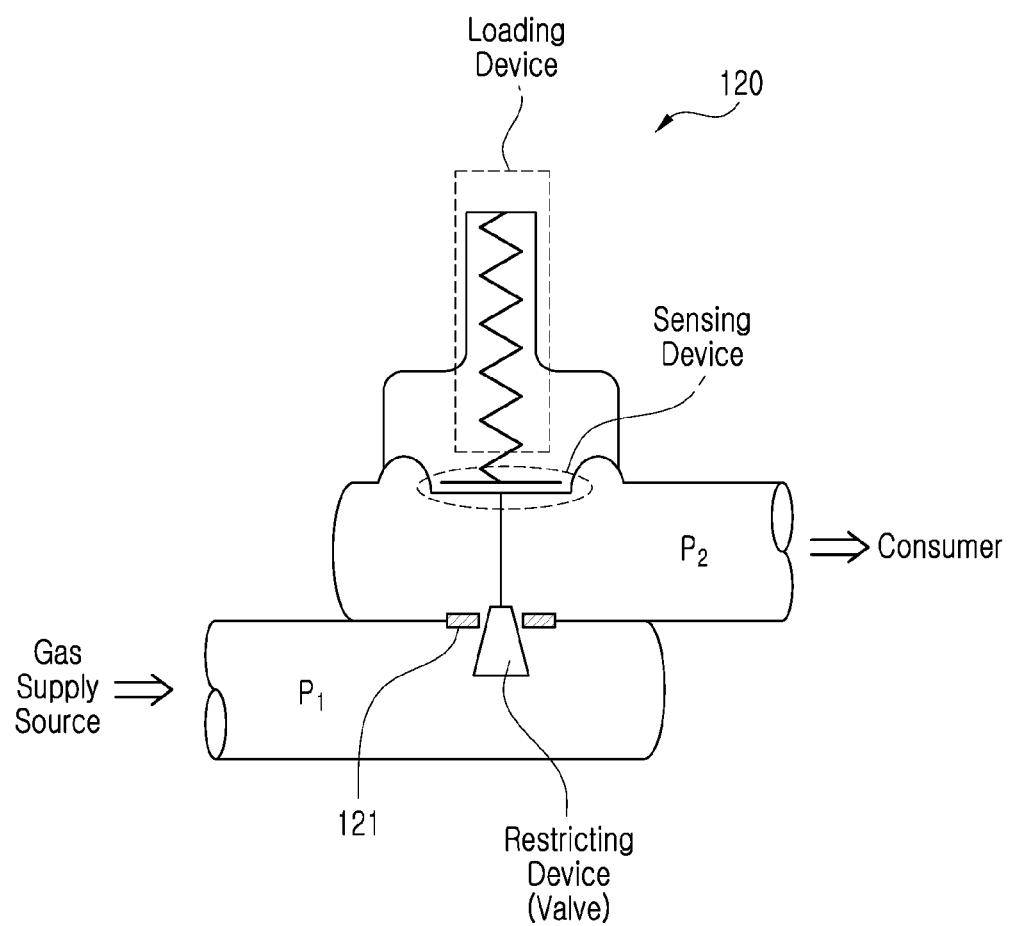
FIG. 3 is a view schematically illustrating a regulator in the high-pressure gas supplying apparatus in FIG. 2.

FIG. 2 is a view schematically illustrating a high-pressure gas supplying apparatus according to an exemplary embodiment of the present disclosure, and FIG. 3 is a view schematically illustrating a regulator in the high-pressure gas supplying apparatus in FIG. 2.

As illustrated in FIGS. 2 and 3, a high-pressure gas supplying apparatus 100 according to an exemplary embodiment of the present disclosure is a high-pressure gas supplying apparatus for delivering gas from a gas supply source 1 to a consumer 2, and includes a main flow path 110, a regulator 120, a first inlet valve 130, a bypass flow path 140, a second inlet valve 150, and an outlet valve 170. Hereinafter, the respective constituent elements will be described in detail still with reference to FIGS. 2 and 3.

As illustrated in FIG. 2, the main flow path 110 is a constituent element for guiding gas from the gas supply source 1 to the consumer 2, and the main flow path 110 may connect the gas supply source 1 and the consumer 2.

As illustrated in FIG. 2, the regulator 120 is a constituent element for adjusting pressure, and the regulator 120 is provided in the main flow path 110 and may adjust pressure (e.g., 100 atm) of gas from the gas supply source 1 to pressure (e.g., 30 atm) required by the consumer 2 For reference, as illustrated in FIG. 3, with the aforementioned configuration of the regulator 120, a pipeline P1 connected to the gas supply source 1 and a pipeline P2 guided to the consumer 2 may be connected through an opening, and a valve seat 121 may be provided in the opening so that the opening may be opened or closed by a valve.

As illustrated in FIG. 2, the first inlet valve 130 is a constituent element for selectively delivering the gas from the gas supply source 1 to the regulator 120, and the first inlet valve 130 may be provided in the main flow path 110 between the gas supply source 1 and the regulator 120. For example, the first inlet valve 130 may be a high flow rate valve that introduces gas at a high flow rate. In particular, in the case in which the first inlet valve 130 is the high flow rate valve, the first inlet valve 130 may be controlled by a control unit (not illustrated) so that the first inlet valve 130 is opened after a second inlet valve 150, which is a low flow rate valve to be described below, is opened.

As illustrated in FIG. 2, the bypass flow path 140 is a constituent element for guiding gas to the regulator 120 without allowing the gas to pass through the first inlet valve 130, and the bypass flow path 140 may be provided in the main flow path 110 between the gas supply source 1 and the regulator 120 so as to bypass the first inlet valve 130. That is, one end of the bypass flow path 140 may be connected to a point in the main flow path 110 between the gas supply source 1 and the first inlet valve 130, and the other end of the bypass flow path 140 may be connected to a point in the main flow path 110 between the first inlet valve 130 and the regulator 120. Therefore, when the first inlet valve 130 is closed and the second inlet valve 150 to be described below is opened, gas may be guided to the regulator 120 through the bypass flow path 140.

Further, as illustrated in FIG. 2, a first orifice 160, which allows a small amount of gas to pass therethrough, may be further provided in the bypass flow path 140. In particular, the first orifice 160 may be installed at a rear end of the second inlet valve 150 to be described below. Therefore, the gas, which is introduced at a low flow rate through the second inlet valve 150, may be applied to the regulator 120 through the first orifice 160 while maintaining the low flow rate.

As illustrated in FIG. 2, the second inlet valve 150 is a constituent element for selectively delivering gas from the gas supply source 1 to the regulator 120 in the state in which the first inlet valve 130 is closed, and the second inlet valve 150 may be provided in the bypass flow path 140 and disposed in parallel with the first inlet valve 130. For example, the second inlet valve 150 may be a low flow rate valve that introduces gas at a low flow rate. In particular, in the case in which the second inlet valve 150 is the low flow rate valve, the second inlet valve 150 may be controlled by the control unit (not illustrated) so that the second inlet valve 150 is opened prior to the opening of the first inlet valve 130 which is the high flow rate valve.

As illustrated in FIG. 2, the outlet valve 170 is a constituent element for guiding the gas, of which the pressure is adjusted by the regulator 120, to the consumer 2, and the outlet valve 170 may be provided in the main flow path 110 between the regulator 120 and the consumer 2. Meanwhile, reference numeral 15 represents a constituent element identical to a safety valve in the related art.

Therefore, with the provided constituent elements, any one of the first and second inlet valves 130 and 150, which is the low flow rate valve, is opened first, and then the remaining inlet valve, which is the high flow rate valve, is opened later, such that it is possible to minimize impact to be exerted on the valve seat 121 of the regulator 120. Ultimately, the minimization of impact may reduce damage to the valve seat 121 caused by impact even though the valve in the regulator 120 is repositioned, and the reduction in damage to the valve seat 121 minimizes a gap between the valve and the valve seat 121, thereby minimizing a gas leak caused by the gap. The minimization of the gas leak may maximally prevent the operation of the safety valve 15, such that the cease of the gas service may be minimized, and maintenance of the apparatus may be minimized.

Hereinafter, a high-pressure gas supplying apparatus 200 according to another exemplary embodiment of the present disclosure will be described with reference to FIG. 4.

Figure 4:
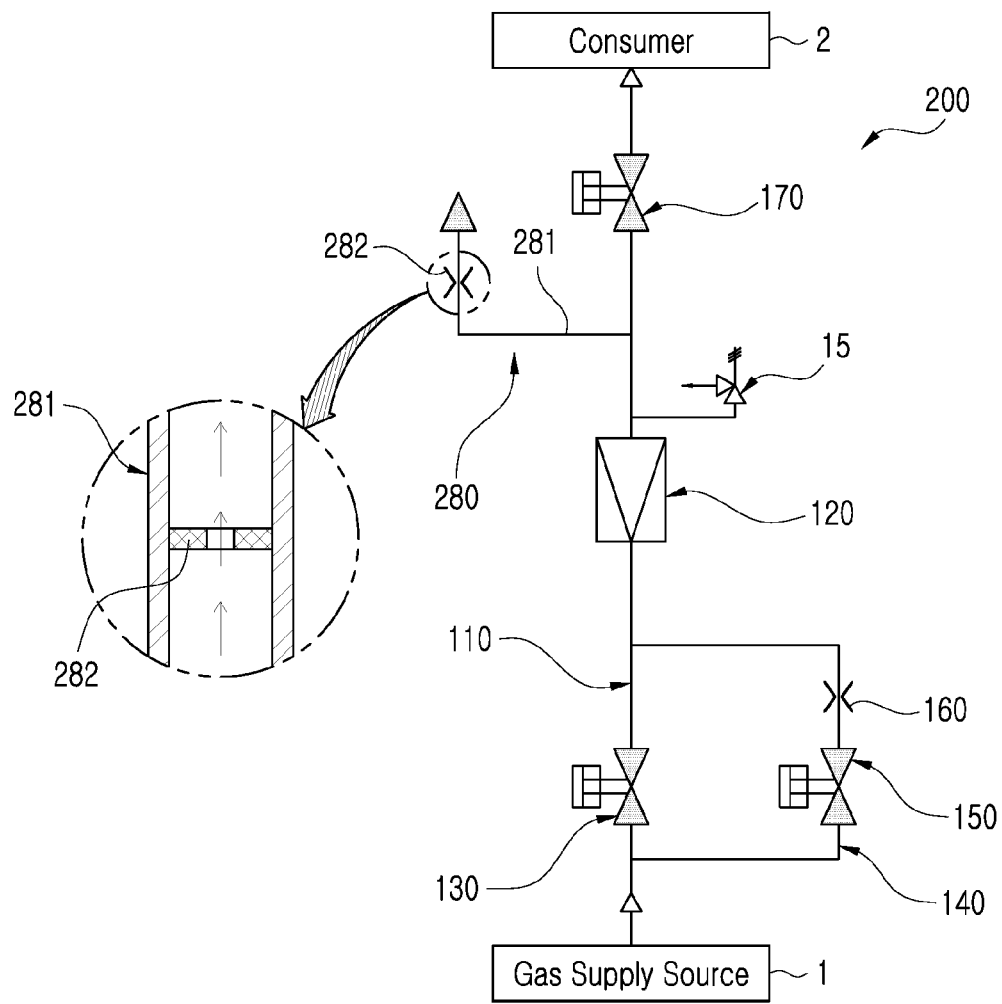
FIG. 4 is a view schematically illustrating a high-pressure gas supplying apparatus according to another exemplary embodiment of the present disclosure.

FIG. 4 is a view schematically illustrating the high-pressure gas supplying apparatus according to another exemplary embodiment of the present disclosure.

As illustrated in FIG. 4, because the high-pressure gas supplying apparatus 200 according to another exemplary embodiment of the present disclosure is identical to the high-pressure gas supplying apparatus described in the aforementioned exemplary embodiment of the present disclosure except that the high-pressure gas supplying apparatus 200 includes a leaking gas discharge unit 280, the leaking gas discharge unit 280 will be mainly described hereinafter.

As illustrated in FIG. 4, the leaking gas discharge unit 280 is a constituent element for discharging leaking gas, which gradually leaks from the regulator 120, to the outside, and the leaking gas discharge unit 280 may be provided in the main flow path 110 between the regulator 120 and the outlet valve 170.

For example, as illustrated in FIG. 4, the leaking gas discharge unit 280 may include a leaking gas discharge flow path 281 and a second orifice 282. The leaking gas discharge flow path 281 may be provided in the main flow path 110 between the regulator 120 and the outlet valve 170, and the second orifice 282 is provided in the leaking gas discharge flow path 281 and may allow a small amount gas to continuously pass therethrough. In particular, the second orifice 282 may have an inner diameter of 0.1 to 0.3 mm so that the small amount of gas may be slowly discharged.

Therefore, even though gas leaks from the regulator 120 in the state in which the outlet valve 170 is closed, the leaking gas discharge unit 280 may gradually, continuously, and slowly discharge the leaking gas to the outside. Ultimately, since the leaking gas may be gradually and continuously discharged to the outside, it is possible to maximally prevent the operation of the safety valve 15, such that it is possible to minimize the cease of the gas service and to minimize the maintenance of the apparatus. In other words, while the gas is not delivered to the consumer 2, the outlet valve 170 is closed and pressure in the main flow path 110 between the regulator 120 and the outlet valve 170 may be increased due to a leak of the regulator 120, but the leaking gas discharge unit 280 may prevent the increase in pressure.

Meanwhile, although not illustrated, a high-pressure gas supplying apparatus according to a modified example of another exemplary embodiment of the present disclosure may discharge leaking gas from the regulator 120 only by using the leaking gas discharge unit 280 without using the bypass flow path 140 and the second inlet valve 150, thereby maximally preventing the operation of the safety valve 15. As a result, the high-pressure gas supplying apparatus may be implemented even in the state in which the bypass flow path 140 and the second inlet valve 150 according to the exemplary embodiment of the present disclosure are omitted.

Hereinafter, a high-pressure gas supplying apparatus 300 according to still another exemplary embodiment of the present disclosure will be described with reference to FIGS. 5 and 6.

Figure 5:
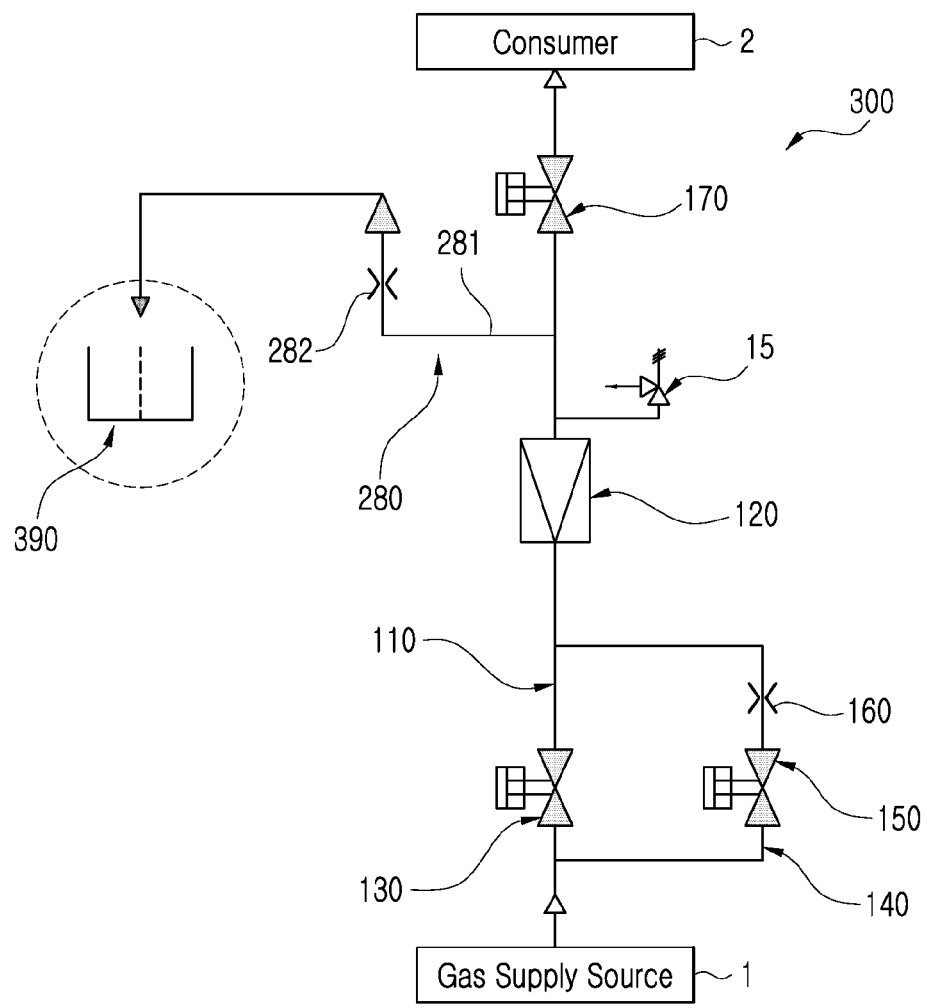
FIG. 5 is a view schematically illustrating a high-pressure gas supplying apparatus according to still another exemplary embodiment of the present disclosure.
Figure 6:
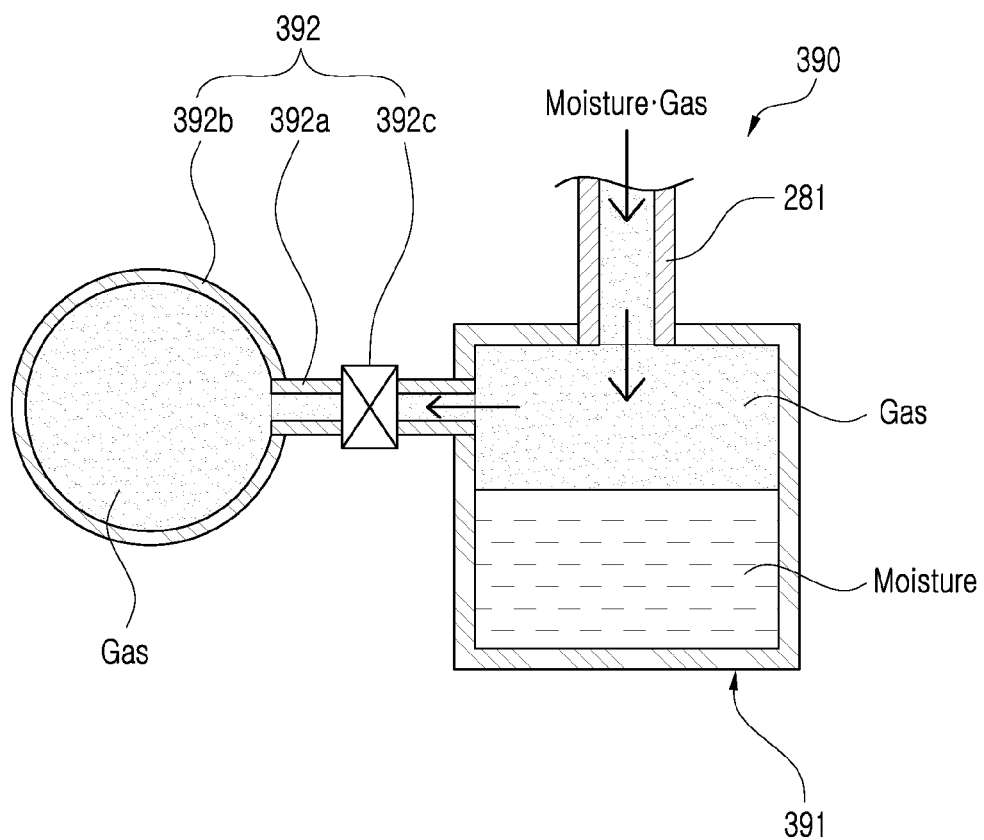
FIG. 6 is a view schematically illustrating an exemplary embodiment of a collector in the high-pressure gas supplying apparatus in FIG. 5.

FIG. 5 is a view schematically illustrating a high-pressure gas supplying apparatus according to still another exemplary embodiment of the present disclosure, and FIG. 6 is a view schematically illustrating an exemplary embodiment of a collector of the high-pressure gas supplying apparatus in FIG. 5.

As illustrated in FIG. 5, because the high-pressure gas supplying apparatus 300 according to still another exemplary embodiment of the present disclosure is identical to the high-pressure gas supplying apparatus described in the aforementioned exemplary embodiment of the present disclosure except that the high-pressure gas supplying apparatus 300 includes a collector 390, the collector 390 will be mainly described hereinafter.

As illustrated in FIG. 5, the collector 390 is a constituent element for collecting moisture produced by a decrease in temperature and gas produced by an increase in temperature at a rear end of the second orifice 282 due to the Joule-Thomson effect, and the collector 390 may be provided at a rear end of the leaking gas discharge flow path 281.

For example, as illustrated in FIG. 6, the collector 390 may include a moisture collecting unit 391 and a gas collecting unit 392. The moisture collecting unit 391 may have a container shape such that gas and moisture are introduced into the moisture collecting unit 391 and moisture fills the moisture collecting unit 391. The gas collecting unit 392 is in communication with an upper end portion of the moisture collecting unit 391 and may draw gas remaining at an upper side of the moisture collecting unit 391 and store the gas.

Specifically, as illustrated in FIG. 6, the gas collecting unit 392 may include a gas collecting container 392$b$, a connecting flow path 392$a$ which connects the gas collecting container 392$b$ to the upper end portion of the moisture collecting unit 391, and a pump 392$c$ which draws gas.

Therefore, since moisture is collected in the moisture collecting unit 391, it is possible to prevent moisture from being introduced into peripheral electric equipment (not illustrated), thereby preventing a short circuit or the like. Further, since gas is collected in the gas collecting unit 392, the gas may be safely reused.

For reference, the following Table 1 shows examples of moisture and gas produced by the Joule-Thomson effect in accordance with types of fluids.

TABLE 1

| Fluid | Inversion Temperature | Remarks (room temperature, 25° C.) |
| --- | --- | --- |
| Air | 757K (484° C.) | Decrease in Temperature µj > 0 → Moisture Produced |
| H2 | 201K (−72° C.) | Increase in Temperature µj < 0 → No Moisture Produced |
| He | 51K (−222° C.) | Increase in Temperature µj < 0 → No Moisture Produced |
| N$_2$ | 621K (348° C.) | Decrease in Temperature µj > 0 → Moisture Produced |
| O$_2$ | 764K (491° C.) | Decrease in Temperature µj > 0 → Moisture Produced |

The high-pressure gas supplying apparatuses 100, 200, and 300 according to the exemplary embodiments of the present disclosure as described above may have the following effects.

The exemplary embodiments of the present disclosure provide the technical configuration including: the main flow path 110, the regulator 120, the first inlet valve 130, the bypass flow path 140, and the second inlet valve 150, in which the main flow path 110 connects the gas supply source 1 and the consumer 2, the regulator 120 is provided in the main flow path 110 and adjusts pressure of gas from the gas supply source 1 to pressure required by the consumer, the first inlet valve 130 is provided in the main flow path 110 between the gas supply source 1 and the regulator 120, the bypass flow path 140 is provided in the main flow path 110 between the gas supply source 1 and the regulator 120 and bypasses the first inlet valve 130, and the second inlet valve 150 is provided in the bypass flow path 140 and disposed in parallel with the first inlet valve 130. Any one of the first and second inlet valves 130 and 150, which is the low flow rate valve, is opened first, and then the remaining inlet valve, which is the high flow rate valve, is opened later, such that it is possible to minimize impact to be exerted on the valve seat 121 of the regulator 120 or the like. Ultimately, the minimization of impact may minimize a gap between the valve and the valve seat 121 even though the valve in the regulator 120 is repositioned, and the minimization of the gap may minimize a gas leak caused by the gap. The minimization of the gas leak may maximally prevent the operation of the safety valve 15, such that the cease of gas service may be minimized, and maintenance of the apparatus may be minimized.

What is claimed is:
1. A gas supplying apparatus comprising:
a main flow path which connects a gas supply source and a consumer;
a regulator which is provided in the main flow path and adjusts pressure of gas from the gas supply source to a pressure required by the consumer;
a first inlet valve which is provided in the main flow path between the gas supply source and the regulator;

a bypass flow path which is provided in the main flow path between the gas supply source and the regulator and bypasses the first inlet valve;

a first orifice which is provided in the bypass flow path and allows gas to pass therethrough;

a second inlet valve which is provided in the bypass flow path and disposed in parallel with the first inlet valve;

an outlet valve which is provided in the main flow path between the regulator and the consumer;

a leaking gas discharge flow path which is provided in the main flow path between the regulator and the outlet valve and discharges leaking gas from the regulator to the outside;

a second orifice which is provided in the leaking gas discharge flow path and allows gas to continuously pass therethrough; and a collector which is provided at a rear end of the leaking gas discharge flow path, collects moisture produced by a decrease in temperature and gas produced by an increase in temperature at a rear end of the second orifice due to the Joule-Thomson effect.

2. The gas supplying apparatus according to claim 1, wherein the first inlet valve introduces gas at a higher flow rate than the second inlet valve.

3. The gas supplying apparatus according to claim 2, wherein the first inlet valve is controlled such that the first inlet valve is opened after the second inlet valve is opened.

4. The gas supplying apparatus according to claim 1, wherein the second orifice has an inner diameter of 0.1 to 0.3 mm.

5. The gas supplying apparatus according to claim 1, wherein the collector includes:
 a moisture collecting unit in which the gas and the moisture are introduced and the moisture is accommodated; and
 a gas collecting unit which is in communication with an upper end portion of the moisture collecting unit and draws the gas.

\* \* \* \* \*